United States Patent [19]

Schuricht

[11] 4,155,443
[45] May 22, 1979

[54] CONVEYING AND STORAGE SYSTEM

[75] Inventor: Henry A. Schuricht, Pontiac, Mich.

[73] Assignee: AMSTED Industries Incorporated, Chicago, Ill.

[21] Appl. No.: 831,228

[22] Filed: Sep. 7, 1977

[51] Int. Cl.² ............................................. B65G 25/02
[52] U.S. Cl. .................................................. 198/774
[58] Field of Search .............. 198/492, 570, 576, 580, 198/602, 773, 774, 775, 776, 836; 74/570, 571 M

[56] References Cited

U.S. PATENT DOCUMENTS

| | | | |
|---|---|---|---|
| 666,865 | 1/1901 | Helfensteller, Jr. | 198/776 |
| 2,156,020 | 4/1939 | Lathrop | 198/836 |
| 2,957,573 | 10/1960 | Eyster | 198/776 |
| 3,565,241 | 2/1971 | Race et al. | 198/774 |
| 3,567,006 | 3/1971 | Bell et al. | 198/492 |
| 3,599,782 | 8/1971 | Whitfield | 198/774 |
| 3,613,869 | 10/1971 | Schuricht | 198/773 |
| 3,678,781 | 7/1972 | Rohrberg et al. | 74/571 M |
| 3,776,351 | 12/1973 | Erb | 198/776 |
| 4,026,409 | 5/1977 | Stockdale | 198/774 |
| 4,042,104 | 8/1977 | Furlette et al. | 198/774 |

Primary Examiner—Robert B. Reeves
Assistant Examiner—Jeffrey V. Nase
Attorney, Agent, or Firm—John L. Schmitt; Fred P. Kostka

[57] ABSTRACT

A plurality of articles to be conveyed and stored for selective delivery to meet an intermittent demand each has an upper end in selective contact with a pair of elongated fixed ride bars extending from a load station to a distant unload station. The upper ride bars form in part a support for the upper ends of the articles. A lower end of each article is in contact with and supported on an elongated movable ride bar positioned below the upper bars so as to maintain the articles in an inclined orientation. By reciprocating the lower ride bar, the articles are walked from the load station to the unload station where they may be accumulated and stored in a damage-resistant stacked condition ready for selective release as required.

10 Claims, 17 Drawing Figures

FIG_17

FIG_15

FIG_16

CONVEYING AND STORAGE SYSTEM

BACKGROUND OF THE INVENTION

1. Field of the Invention

This invention relates to a conveyor and storage system for articles and more particularly to a system providing station-to-station movement of the articles with interim storage allowing an input rate of the articles into the system to vary with respect to an output rate from the system.

2. Description of the Prior Art

One most common form of a conveying system is a simple belt driven conveyor wherein articles are transported from one station to another. In such a conveyor, the space-time relationship between articles is constant between the load station and the unload station.

Another simple conveyor system comprises a roller conveyor including a series of freely rotatable rollers allowing articles deposited thereon to be moved manually from the one end to the other without the applying of power to the rollers. Such a conveyor is ideal where temporary storage of the article is required as, for example, to allow work to be performed on the article.

Another conveyor system provides both a driven and undriven section. Articles are carried along a driven section from a load station to an accumulation station where the article is free of its driving section. The accumulation station may accommodate a work performing means with the article reengaging with the driven section for movement after completion of the work to an unload station. Varying space-time relationships between articles are provided by using different loading patterns and by the undriven accumulation station.

Still another conveyor system arranged for movement in a closed loop and includes a plurality of rectangular pallets on which articles may be selectively loaded and unloaded. A portion of the loop is powered by a timing chain which separates and positions the pallets longitudinally to provide a regulated time-spaced relationship between articles. A remaining portion of the loop is unpowered wherein the pallets are rotated 90 degrees and placed in a stacked condition. As each new pallet arrives at an inlet end of the unpowered portion, it pushes from the exit end of the unpowered portion the last pallet deposited thereon so that it reenters the powered portion after rotating to a longitudinal position. Thus, within one closed loop two distinctly different time-space relationships between articles is created allowing distinctly different functions to be provided with respect to the articles, i.e., movement v. storage.

Another system patented by the present inventor is disclosed in U.S. Pat. No. 3,613,869 where articles are lifted from a station at one elevation to a station at another elevation by a two directional oscillating conveyor arrangement having a drum-like configuration.

SUMMARY OF THE INVENTION

The conveying and storage system of the present invention includes an elongated first fixed support bar extending between a first station and a second station. Below the first bar is a second movable bar extending between the two stations. The bars are spaced vertically such that articles are in an inclined orientation when supported between the upper and lower bars.

The lower movable bar is in operative contact with a plurality of spaced eccentric cam assemblies which are interconnected by a common drive so that the lower movable bar may be reciprocated vertically in uniform cycles over its entire length. This reciprocating motion imparts in the nature a walking motion which conveys the articles from the first station to the second station where the articles may be selectively accumulated and stored for release as required.

The walking movement is produced by the following sequential series of movements. First, during an upward portion of the reciprocation cycle, the article is lifted by the lower movable bar such to disengage the upper article end from the fixed or stationary upper bar. Secondly, because the article is in an inclined position, the upper end of the article rotates about a pivot formed at the point contact of a lower end of the article and the lower movable bar. Thirdly, this rotation of the article continues until the upper end reengages the upper fixed bar at a more forward point.

Fourthly, during a downward portion of the reciprocation cycle, the lower end of the article is disengaged from the lower movable bar because the upper bar limits the downward vertical movement of the article. Fifthly, upon such disengagement, the lower end of the article rotates forward about a pivot at the point contact between the upper end of the article and the upper fixed bar. This rotation occurs as a result of the force of gravity acting on the inclined article until it reengages the lower movable bar at a more forward point. In this manner, each reciprocation cycle produces an incremental forward movement of the article.

If a stop is provided at the second station, articles accumulate in a stacked condition, i.e., rest against each other. In this stacked condition, the articles continue to rise and fall but all forward movement is stopped. Since the rise and fall of each article is uniform, there is no relative movement between the stacked articles or between the stacked articles and the lower movable bars and limited movement between the stacked articles and the upper support bar. The continued movement of the stacked articles permits the unstacked articles to engage the stack in a damage or wear-resistant manner because of the limited movement therebetween.

There are several important advantages of the conveying and storage system of this invention over other known systems.

Firstly, because of the limited mechanical movement, i.e., a simple reciprocation of an elongated bar, a minimum energy input is required.

Secondly, the support bars and the articles have a limited surface contact so as to minimize wear.

Thirdly, movement and storage is provided by a single structure in contrast to prior known systems the drive and support means required separation to accomplish these functions.

Fourthly, movement and storage is automatically controlled by the selective release of accumulated articles from the system. Thus, there is no need for intermediate or additional sensing device to activate or deactivate the system to maintain a proper balance between input and output of the articles. All of the input is simply placed into storage to meet future demand. The system is filled to capacity when no further articles can be physically loaded on the bars. Note that the time-space relationship of released articles may be constant or selectively controlled by the stop, while the time-space relationship of loading articles over a short time space may be varied without regard to the time-space relationship released articles.

Lastly, when the articles accumulate in a stacked condition, there is minimum relative movement between articles thus reducing the possibility of damage or wear to the articles caused by movement therebetween.

DESCRIPTION OF THE PREFERRED EMBODIMENT

Figure 1:
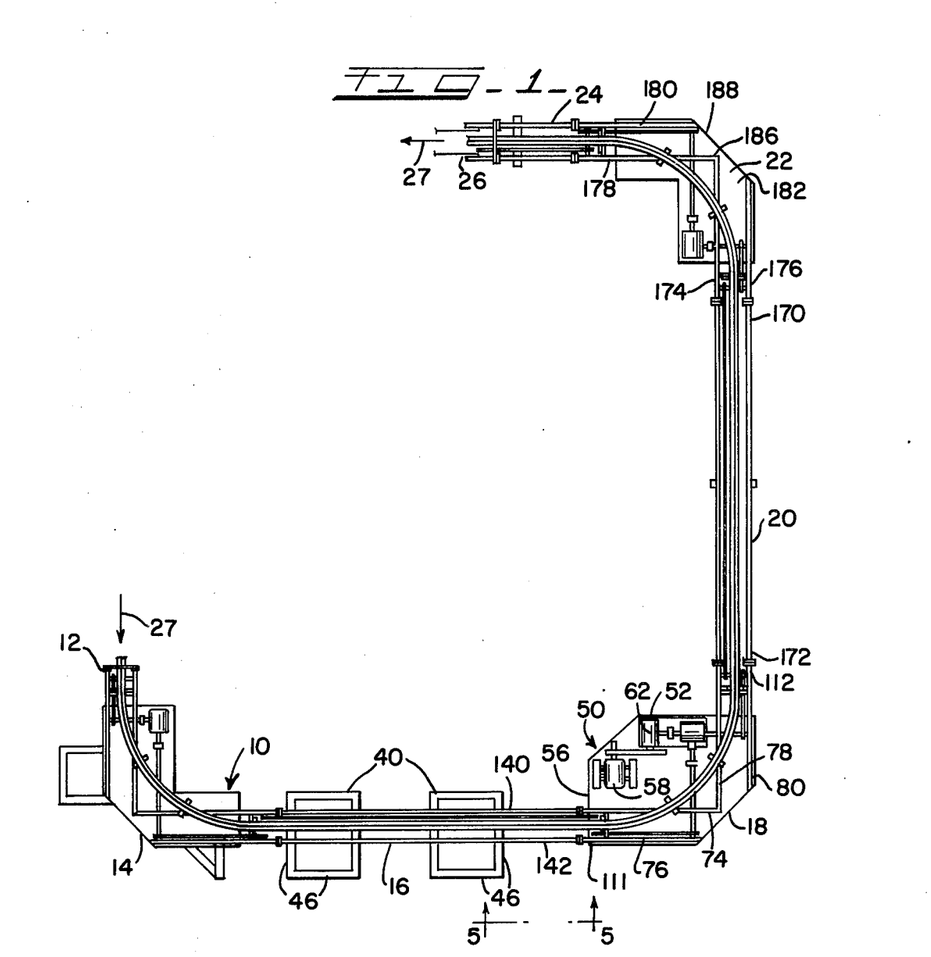
FIG. 1 is a top plan view of a typical conveying and storage apparatus incorporating the conveying and storage system of the present invention.

A typical conveying and storage apparatus incorporating a conveying and storage system of the present invention is shown generally at 10. As best seen in FIG. 1, the apparatus 10 includes a load terminal or station 12, a first corner 14, a first straight section 16, a second corner 18, a second straight section 20, a third corner 22, a third straight section 24 and an unload station 26. It should be understood that the system can be constructed in an infinite number of layout configurations to meet the needs of a user. Where a straight configuration, for example, cannot be used to connect a loading station with a discharge station because of interpositioned equipment or building structure, such obstacles can be avoided by utilizing a configuration to create a path of movement 27 to by-pass such obstacles.

The storage and conveying apparatus 10, in the exemplary embodiment, is adapted for the conveyance and storage of automotive connecting rods 28 having an elongated center portion 30, a crankshaft connecting end portion 32 and a piston pin connecting end portion 34. The crankshaft connecting end portion 32 has two outwardly extending fastening brackets 35 on each side thereof. However, it should be understood that the system of this invention is in no way limited to handling connecting rods 28 but can be adapted to move, store and discharge many other articles 36 having varying configurations.

The apparatus 10 is suitably supported on a plurality of support frames 40 generally including four upright legs 42 connected by lower stretchers 44 and upper cross bars 46 joining top end 48 of the legs 42.

To power the conveying and storage apparatus 10, a drive 50 is generally positioned at a proximate midpoint in the system between the load station 12 and the unload station 26. Since in the exemplary configuration the midpoint proximates the position of the second corner 18, the second corner 18 is conveniently made a drive corner 52 which accommodates the drive 50 and the first and third corners 14 and 22 include power transmission means, as more fully to be explained hereinafter.

Figure 3:
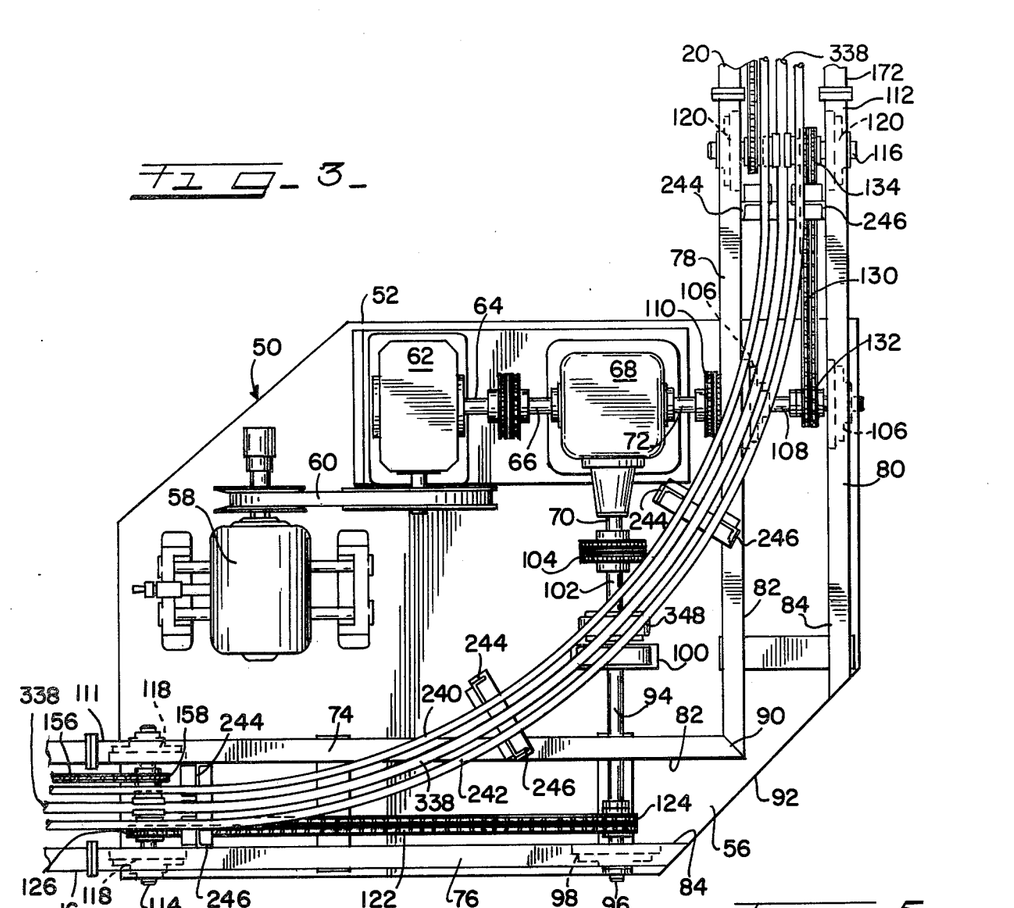
FIG. 3 is an enlarged fragmentary top plan view of a typical 90 degree corner of the conveying and storage apparatus of FIG. 1 and showing a power drive source incorporated therein.

As may be more easily understood by viewing FIG. 3, the drive corner 52 includes an L-shaped drive corner support stand 54 carrying an L-shaped base plate 56 to which there are fastened the various components of the drive 50. The drive components include an electric motor 58 which is connected by a belt 60 to a speed reducer 62 having a reduction ratio proximating 40 to 1. An output shaft 64 of the speed reducer 62 is connected with an input shaft 66 of a load divider 68 having a first output shaft 70 and a second output shaft 72 positioned perpendicular relative to each other. The use of the load divider 68 allows the motor 58 to be located within the drive corner 52 and provides a source of rotary power in each direction therefrom.

The drive corner 52 further includes a first and second pair of inner and outer spaced support channel segments 74, 76 and 78, 80. The channel segments of each pair, for example, segments 74, 76, are positioned in an opposing manner such that inner vertical surfaces 82, 84 of each channel segment 74, 76 face each other while a top and bottom flange 86, 88 of each extend outwardly therefrom.

In the drive corner 52, the inner channel segments 74, 78 form a 90 degree mitered joint 90 while the outer channel segments 76, 80 are mitered to align with a mitered outside corner 92 of the base plate 56. The first pair of inner and outer channel segments 74, 76 in part support a first drive shaft 94 which has its outer end 96 rotatably journaled in a first drive bearing 98 carried by the outer channel segment 76. Because of the length of the first drive shaft 94, a pillow block 100 may be required to support an opposite inner end 102 which in turn connects with the first output shaft 70 of the load divider 68 through a couple 104.

The second pair of inner and outer channel segments 78, 80 serve as a support for a pair of second drive bearings 106 in journaling a second drive shaft 108 which is connected with the second output shaft 72 of the load divider 68 by another couple 110.

At outer ends 111, 112 of the first and second pair of inner and outer support channel segments 74, 76 and 78, 80 are a first and a second drive corner shaft 114, 116. Each shaft 114, 116 is journaled in a pair of bearings 118, 120 which in turn are carried by the channel segments 74, 76 and 78, 80 respectively. Connecting the first drive corner shaft 114 with the first drive shaft 94 is a first dual chain 122 supported on dual chain sprockets 124, 126 carried by the respective first shafts 94, 114. Similarly, a second dual chain 130 connects the second shafts 108, 116 through dual chain sprockets 132, 134 carried by the respective shafts 108, 116.

Figure 2:
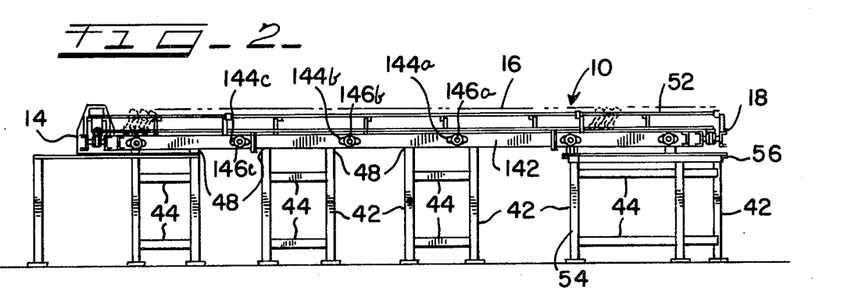
FIG. 2 is a front elevational view of the conveying and storage apparatus of FIG. 1.

Since the structure of the first and second straight conveyor sections 14, 20 and related drive assembly are generally similar, only one straight section need be described, and the structure of a straight section may be better understood by viewing FIGS. 2, 5 and 7 concurrently with the below description.

Each straight section, as an example the first straight section 16, has a like pair of spaced inner and outer support channels 140, 142 which serve as supports for pairs of intermittently spaced intermediate bearings 144 in which are journaled intermediate shafts 146 respectively. The first straight section 16 has three pairs of intermediate bearings 144a, 144b and 146c. On each shaft 146 there is fastened a pair of single chain sprockets 148, 150 with the shaft 146a carrying sprockets 148a, 150a, the shaft 146b carrying sprockets 148b, 150b and the shaft 146c carrying sprockets 148c, 150c. The sprockets designated 148 are located adjacent to the inner support channel 140 while the 150 designated sprockets are positioned next to the outer support channel 142. A first single chain 152 connects the sprockets 150a and 150b and a second single chain 154 connects the sprockets 148b and 148c (not shown).

The first straight conveyor section 16 and the drive corner 52 are in turn connected by a single chain 156 engaging the sprocket 148a of the intermediate shaft 146a and a single chain sprocket 158 carried by the first drive corner shaft 114. In this manner, power is transferred from the motor 58 through the drive corner 52 and to the first straight section 16. In a like manner, power is transferred to the second straight section 20.

Figures 4, 6, 8:
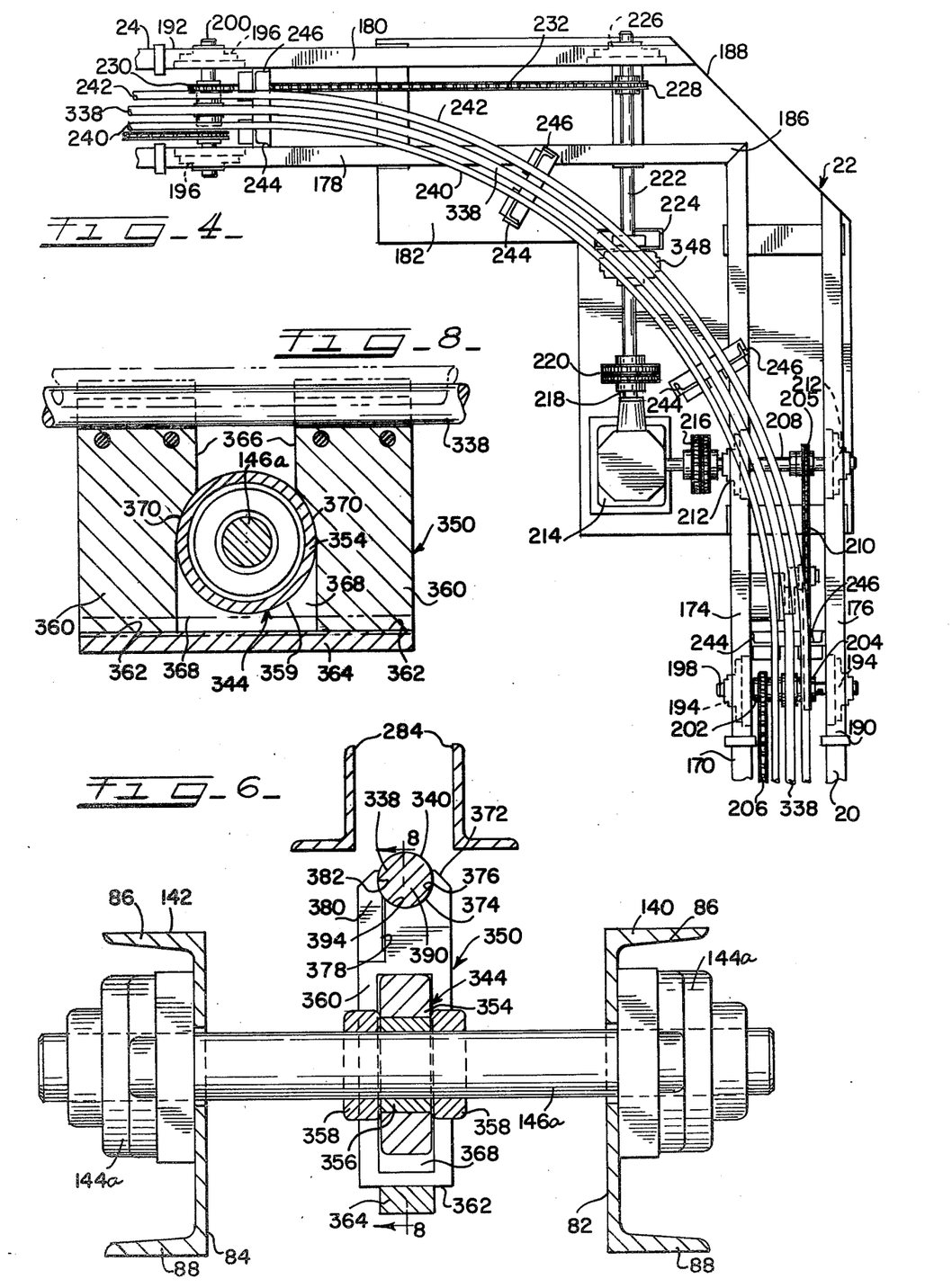
FIG. 4 is an enlarged fragmentary top plan view of another 90 degree corner of the conveying and storage apparatus including power transmission means.
FIG. 6 is a cross-sectional view taken generally along the line 6—6 in FIG. 5.
FIG. 8 is a cross-sectional view taken generally along the line 8—8 in FIG. 6.

Referring now to FIG. 4, there is shown the third corner 22, connecting to an end 170 of the second straight conveyor section 20 with an opposite end 172 connecting with the outer end 112 of the drive corner 52. The third corner 22 typifies the structure also found at the first corner 14. The corner section 22 has a like pair of inner and outer spaced support channel segments 174, 176 and 178, 180 supported on an L-shaped base plate 182 which in turn is carried by a support stand (not shown) similar in design to the corner support stand 54. The inner support channel segments 174, 178 have 45 degree mitered ends forming a right angle joint 186 while inner ends of the outer channels 176, 180 are likewise mitered to align with a mitered corner 188 of the base plate 182. Outer ends 190 and 192 of the support channel segments 174, 176 and 178, 180 extend beyond the base plate 182 and each carry a pair of bearings 194 and 196 in which are journaled first and second driven corner shafts 198, 200 respectively.

On the shaft 198 is a pair of single chain sprockets 202, 204 with the sprockets 202 connected to an adjacent intermediate shaft (not shown) of the third straight conveyor section 24 by a single chain 206 which transfers power to the first driven corner shaft 198.

The chain sprocket 204 in turn is connected to another chain sprocket 205 supported on a shaft 208 by a single chain 210. The shaft 208 is in turn journaled in a pair of bearings 212 carried by the inner and outer support channels 174, 176. The shaft 208 extends inwardly and is joined to a right angle bevel gear drive 214 by a couple 216. An output shaft 218 of the drive 214 connects through another couple 220 to an elongated shaft 222 rotatably supported in a pillow block 224 and bearing 226 carried by the outer support channel segment 180 adjacent to its mitered inner end. Single chain sprockets 228 and 230 carried by shafts 222 and 200 respectively, are connected by a single chain 232. In a like manner, the second driven corner shaft 200 connects with the third straight conveyor section 24.

In the exemplary embodiment, the distance from the first and third corners 14, 22 to the load and unload terminals 12, 26 is relatively short. It should be understood that additional driven corner and straight sections can be added as required.

Figures 7, 9, 10:
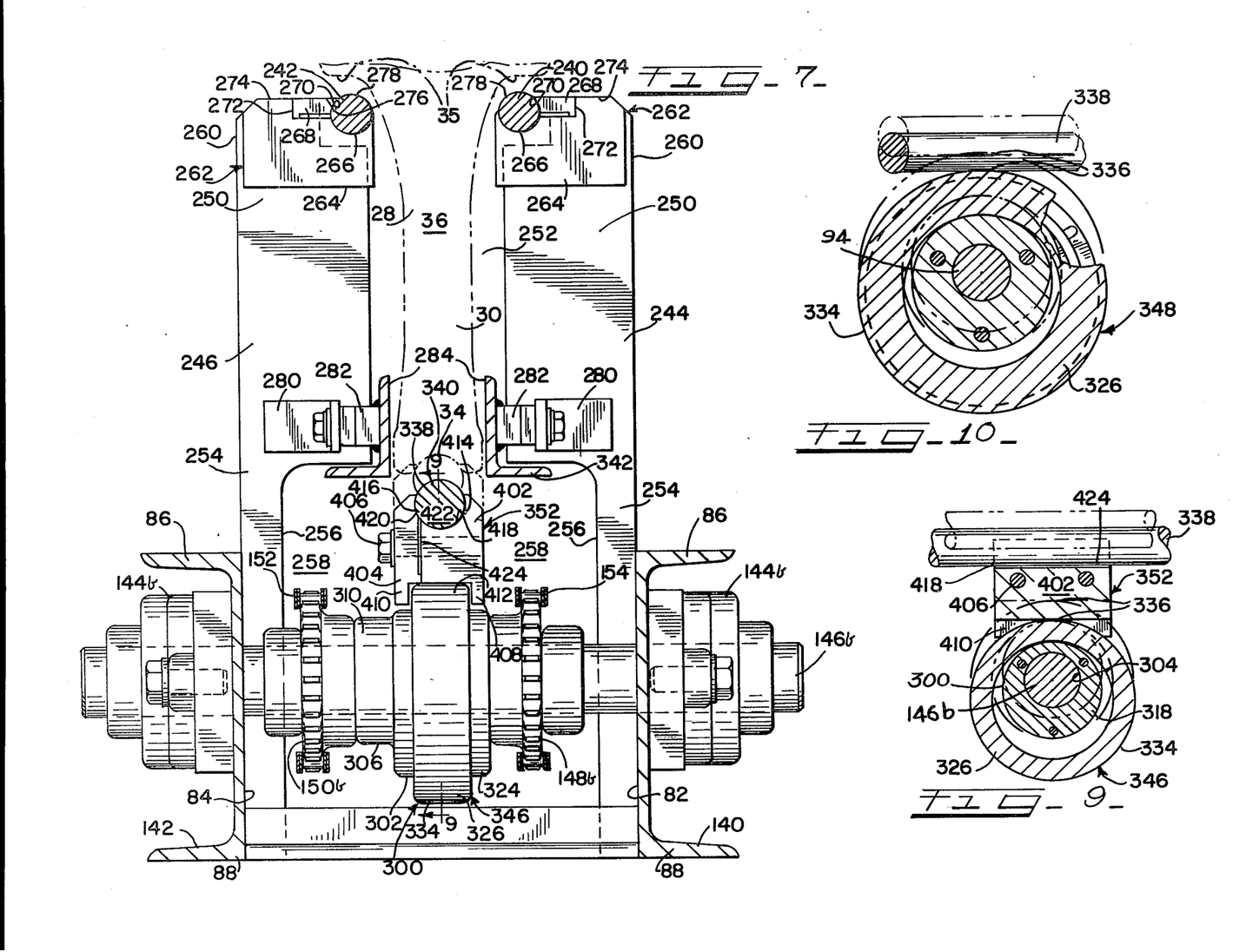
FIG. 7 is a cross-sectional view taken generally along the line 7—7 in FIG. 5.
FIG. 9 is a cross-sectional view taken generally along the line 9—9 in FIG. 7.
FIG. 10 is an enlarged elevational view in partial section of a cam assembly utilized in the corner portion of the conveying and storage apparatus.

As shown in FIG. 7, the articles 36 to be conveyed are in part supported by two upper, horizontally spaced, elongated, circular and stationary ride bars 240, 242. Periodically spaced and fastened to the support channels, as an example the inner and outer support channels 140, 142 of the first straight section 16, is a pair of inner and outer angle uprights 244, 246 each having one flange 248 attached to an inner vertical face 82, 84 of each support channel 140, 142 and its other flange 250 projecting inwardly but separated sufficiently to form an upper space 252 to allow passage of the articles 36. A lower portion 254 of the flange 250 of each angle 244, 246 is formed with a cutout 256 so as to provide a larger lower space 258 accommodating the power chain, as an example chains 152, 154, supported in part by the sprockets 148b, 150b carried by the shaft 146b.

At an upper end 260 of each angle upright 244, 246 and attached to the flange 250 of each is a ride bar clamp assembly 262 comprising a clamp block 264 formed with a partial circular cutout 266 in its inner upper corner to accommodate each ride bar 240, 242 respectively. The cutout 266 has an area proximating 180 degrees so that each ride bar 240, 242 may be merely placed in the cutout 266 rather than having to insert an end of the ride bar, as an example bar 240, in the cutout 266 and then threading the bar 240 through the cutout 266 until properly located. To retain the ride bars 240, 242 in cutout 266, a retaining bracket 268 having an engaging surface 270 formed on an arc complementary to that of the ride bars 240, 242 is fastened in a conventional manner in a recess 272 formed along a top edge 274 of the clamp block 264. The retaining bracket 268 engages an outer and upper portion 276 of an outer peripheral surface of the ride bars 240, 242 over a proximate 45 degree segment so that a proximate 135 degree top segment 278 of each ride bar 240, 242 remains exposed. This segment 278 of each ride bar 240, 242 forms a support surface for the articles 36. It is to be noted that the clamp assembly 262 is constructed such that the ride bars 240, 242 may be rotated as the ride bars 240, 242 wear as a result of the articles being movably supported thereon.

Below each clamp assembly 262 and on each angle upright 244, 246 is an angle bracket 280 which forms support for spacers 282 to which is attached angle guide rails 284. These rails 284 serve as a guide for a bottom portion of the articles 36 and in this case the bottom piston pin connecting portion 34 of the connecting rod 28. In the corner sections, as an example drive corner 52, the pair of guide angle rails 284 may be replaced by lengths of plate which may be more easily formed on a radius to define the path of movement 27 about the drive corner 52.

On each intermediate shaft, for example the shaft 146b, and between the chain sprocket 148b, 150b is a cam assembly. This assembly may either be an eccentric assembly or a concentric assembly.

Figure 15:
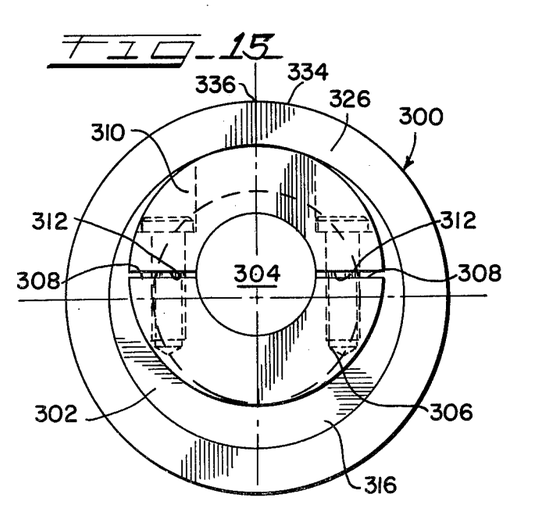
FIG. 15 is an elevational view of an eccentric typical cam assembly.
Figure 16:
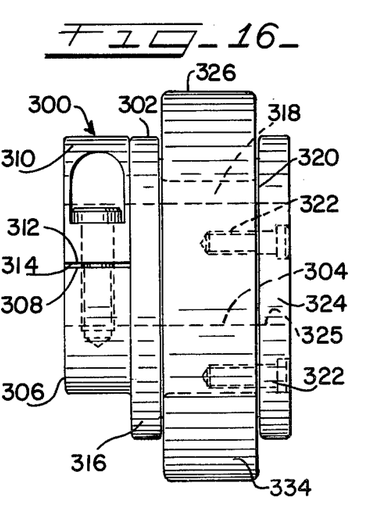
FIG. 16 is an end view of the cam assembly of FIG. 15.

A typical eccentric assembly 300, seen in FIGS. 15 and 16, comprises a bushing plate 302 having a transverse circular opening 304 therein to receive, for example, the shaft 146b. The opening 304 is eccentrically offset from a center line of the bushing plate 302 proximately ¼ inch. The bushing plate 302 has a fixed outer semi-circular collar portion 306 concentrically aligned with the opening 304 and has flat joining surfaces 308 which align and are disposed in each side of the opening 304. The fixed collar portion 306 and a like semi-circular removable collar portion 310 having like joining surfaces 312 form a compression joint 314 when fastened about a typical shaft.

Adjacent the fixed collar portion 306 is an annular flange 316 having a larger outer diameter than the fixed collar portion 306 and which is concentrically located with respect to the center line of the bushing plate 302. On an opposite side of the flange 316 is a circular bearing support portion 318 concentrically positioned with respect to the center line of the bushing plate 302 and eccentrically offset ¼ inch from the opening 304. An exposed face 320 of the bearing support portion 318 contains three threaded apertures 322 for assembly of a circular face plate 324 having an outer diameter proximating that of the annular flange 316 and aligning therewith and having a circular opening 325 for, as an example, the shaft 146b.

Between the face plate 324 and the annular flange 316 is a roller bearing 326 having its inner race 328 assembled on the bearing support portion 318. Both the face plate 324 and bushing plate 302 are marked so as to identify the top-dead-center of the eccentric provided by the offset openings 304 and 325 respectively.

An outer race 334 of each bearing 326 is of a sufficient diameter to extend beyond the annular flange 316 and bushing plate 324 and form a nonrotating engaging surface 336.

As seen in FIGS. 6 and 8 is a concentric cam assembly 344. In FIGS. 7, 9 and 10 are two eccentric cam assemblies 346 and 348. The concentric assembly 344 connects with a first clamp guide assembly 350 in which in turn is fastened an elongated round lower movable ride bar 338. As seen in FIGS. 7 and 9, a second clamp guide assembly 352 interfaces between the cam assembly 346 and the lower ride bar 338. In FIG. 10 the cam assembly 348 comes in direct contact with the lower ride bar 338.

The outer race 334 of the bearing 326 of the eccentric cam assembly 300 remains substantially stationary but imparts a rise and fall movement or vertical reciprocation to the lower ride bar 338 aligned with a vertical axis of the conveyor 10 and positioned such that its reciprocation motion takes a top surface 340 of the lower ride bar 338 from a position just below a bottom surface 342 of the guide angle rails 284 to a position immediately above the bottom surface 342.

A distance between the lower ride bar 338 and the upper ride bar 240, 242 is regulated by the configuration of the article 36.

The concentric cam assembly 344 includes a roller bearing 354 disposed over a bushing 356 which in turn is assembled on, for example, the shaft 146a. The longitudinal position of the bearing 354 on the shaft 146a is maintained by a pair of collars 358.

Figure 5:
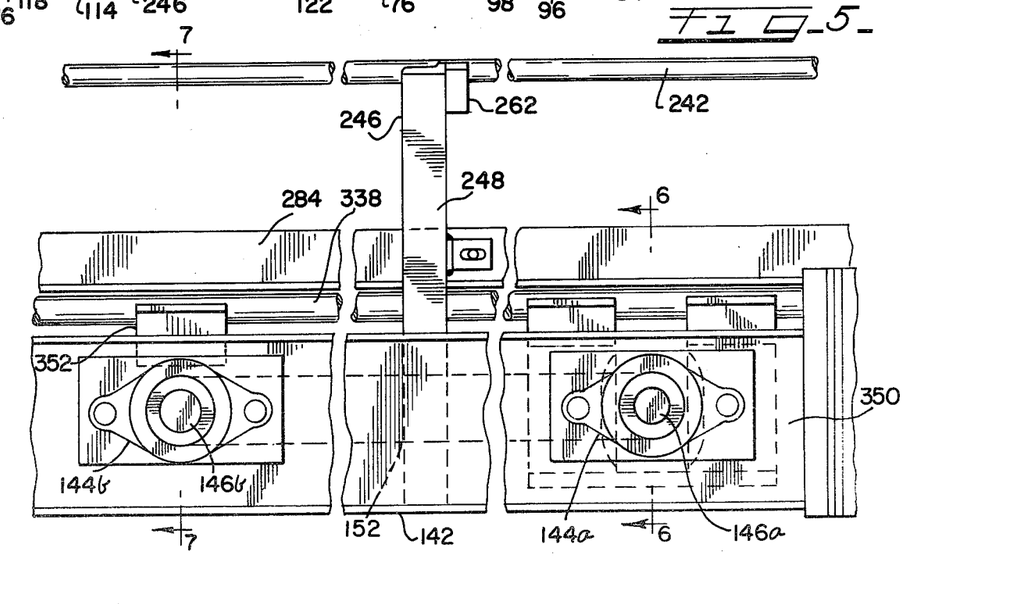
FIG. 5 is a fragmentary elevational view taken generally between the lines 5—5 of FIG. 1.

The clamp guide 350 and the concentric cam assembly 344 may be used at one end, for example, of the straight section 16 as seen in FIG. 5. The guide 350 includes spaced block parts 360 which are joined along a bottom edge 362 of each by a bar 364. Each block 360 has formed on an inner vertical face 366 a vertical slot 368 terminating on a radius end 370 which merges with the vertical face 366. The slots 368 and radius ends 370 accommodate an outer race 359 of the bearing 354 for the cam assembly 344. The clamp guide 350 and the concentric cam assembly 344 allow vertical movement of the lower ride bar 338 and prevent any horizontal movement of such.

Along a top inner edge 372 of each block part 360 is an elongated semi-circular cutout 374 to receive a bottom and side portion 376 of the lower ride bar 338. Below the cutout 374 in each block 360 is a horizontal recess 378 to receive a clamping bracket 380 having an elongated radiused cutout 382 such that the lower ride bar 338 may be clamped in place in an opening 390 formed by the radiused cutout 382 of the bracket 380 and the radiused cutout 374 of the block 369. The top surface 340, proximating 135 degrees of an outer peripheral surface 394 of the lower ride bar 338 remains exposed.

The clamp guide assembly 352 of FIGS. 7 and 9 is formed by the joining of an elongated block portion 402 and a clamping bracket 404 by fasteners 406. Along a bottom outer edge of the block portion 402 and the clamp bracket 404 are downwardly extending longitudinal flanges 408, 410, respectively, such that upon assembly a recess 412 is formed therebetween to receive the outer race 334 of the bearings 326 of the cam assembly 346.

Along a top inner edge 414, 416 of the block portion 402 and the clamping bracket 404 is an elongated radiused cutout 418, 420 forming an opening 422 to receive the lower ride bar 338 and form in a like manner a compression joint 424 about the lower ride bar 338 while leaving the top surface 340 of proximately 135 degrees of the lower ride bar 338 exposed.

The clamp assembly 352 may be used to join abutting ends and (not shown) of the lower ride bar 338 which extends typically beyond, as an example the end 170 of the second straight section 20, and into the driven corner 22.

Note that both clamp guides 350 and 352 allow the lower ride bar 338 to be rotated as its exposed top surface 340 flattens from use.

Figure 11:
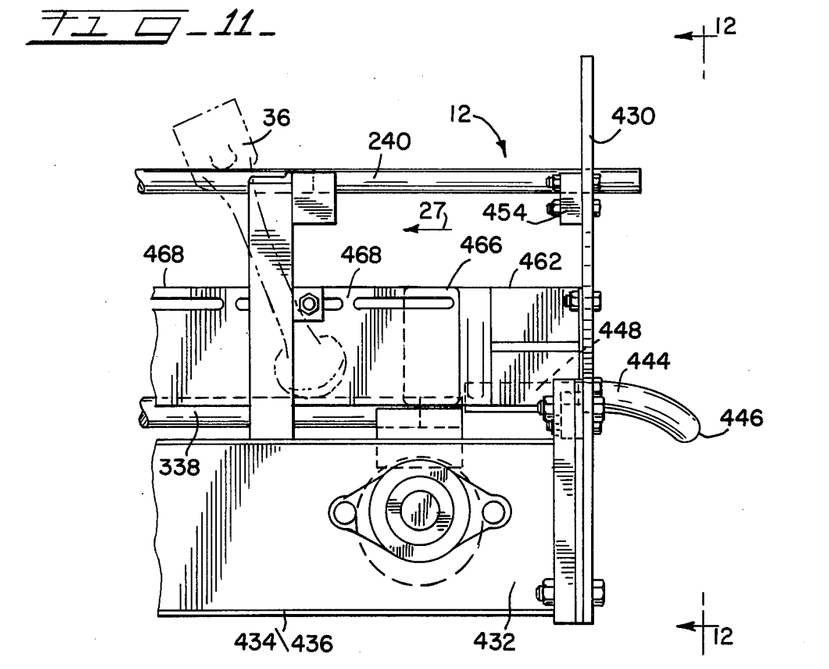
FIG. 11 is a fragmentary side elevational view of a load station of the apparatus in FIG. 1.
Figure 12:
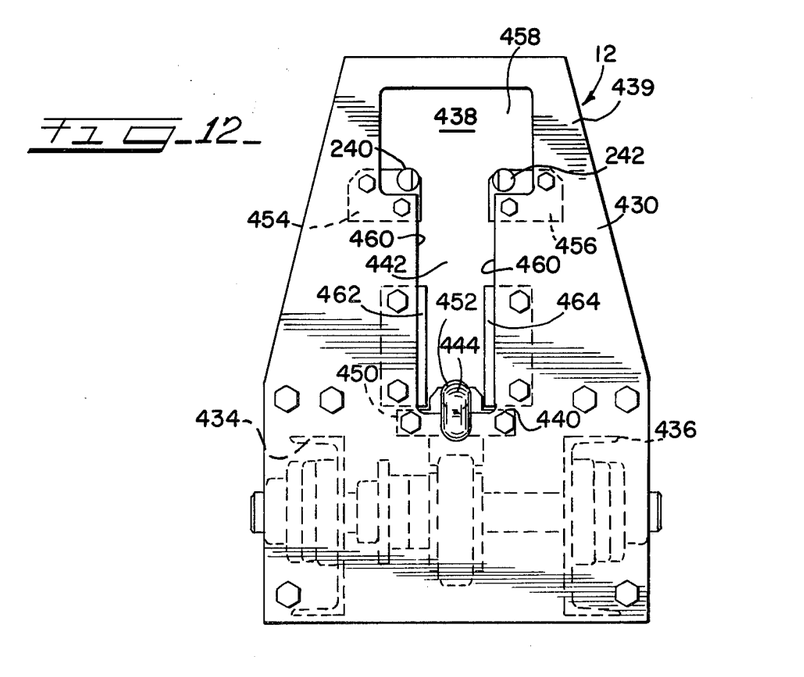
FIG. 12 is a front elevational view of the load station taken along the line 12—12 in FIG. 11.

The load station or terminal 12 as seen in FIGS. 11 and 12 includes a face plate 430 which is positioned transversely across ends 432 of a pair of inner and outer support channels 434, 436 of the load terminal 12 and has a lower portion 437 conveniently fastened to such. The plate 430 extends upwardly from the channels 434, 436 and is formed with an opening 438 in an upper portion 439 which conforms to the general configuration of the articles 36 to be conveyed and stored, and in the exemplary embodiment is T-shaped to receive the automotive connecting rod 28. Extending through a bottom end 440 of a vertical leg portion 442 of the T-shaped opening 438 is a stationary ride bar segment 444 having an outwardly extending and downwardly radiused outer end portion 446 and a straight inner end portion 448 which aligns with the lower ride bar 338 when such has reciprocated to its maximum height position. The segment 444 is held in place by a clamp 450 which exposes proximately 135 degrees of its top portion 452 and a fastener (not shown) extending vertically through the clamp 450 for threaded engagement with the segment 444. The upper pair of stationary ride bars 240, 242 extends through the opening 438 and are fixedly held by clamps 454, 456 fastened to the face plate 430 adjacent to a junction of the vertical leg portion 442 of the opening 438 and its horizontal leg portion 458.

Along vertical sides 460 of the vertical leg portion 442 of the opening 438 is an inner and outer guide bracket 462, 464 which extends inwardly from the face plate 430 a sufficient distance to form an overlapping joint 466 with a pair of spaced vertical guide plates 468 of the first corner 14.

Figure 13:
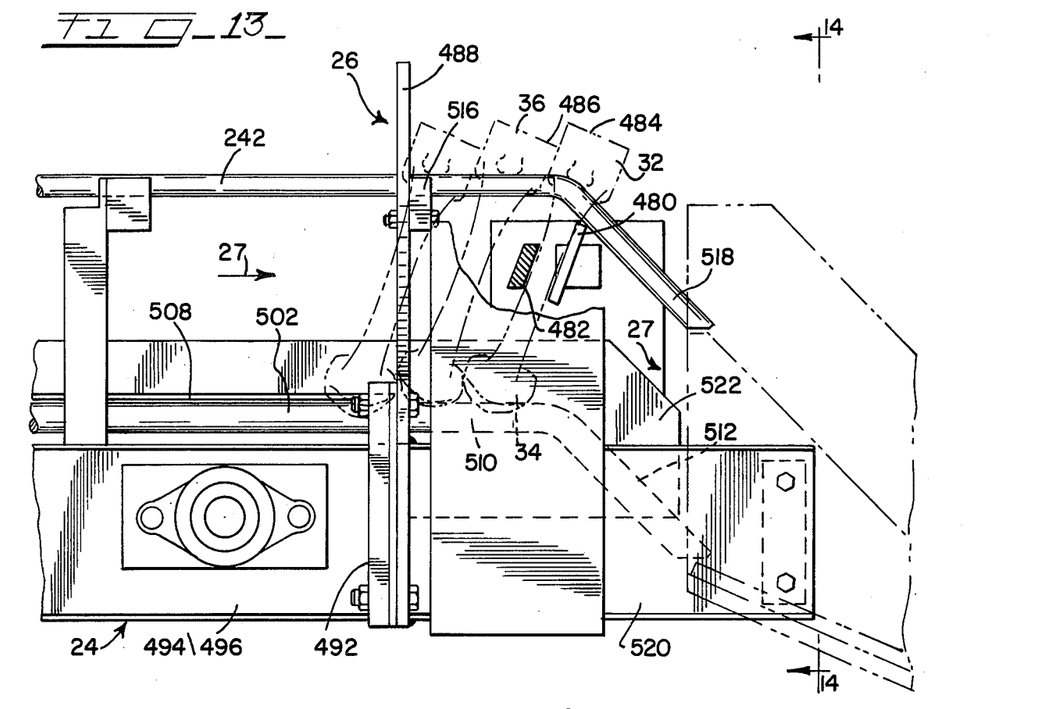
FIG. 13 is a fragmentary side elevational view of an unload station of the apparatus of FIG. 1.
Figure 14:
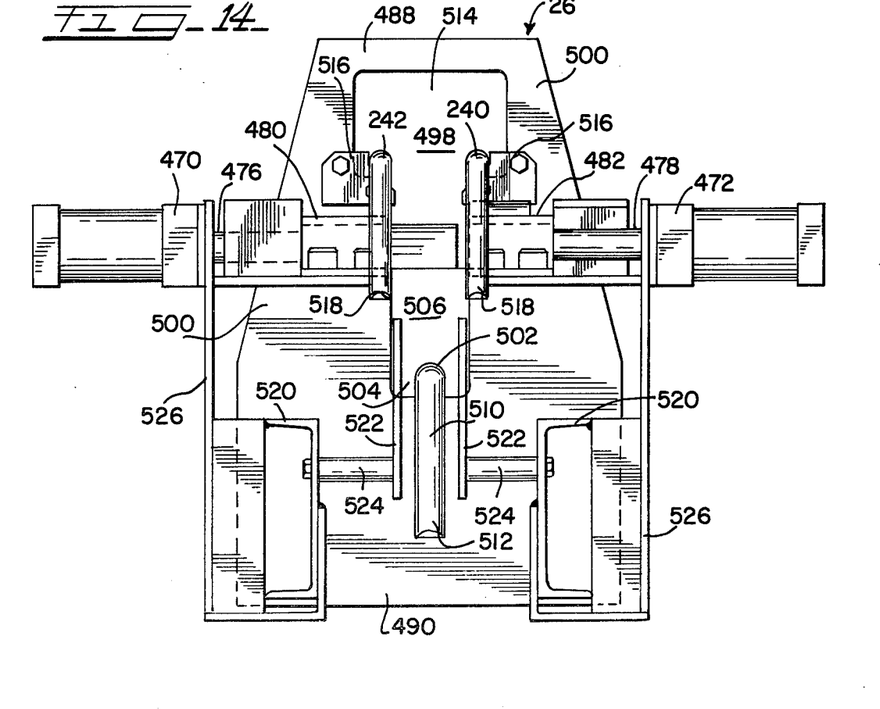
FIG. 14 is a front elevational view of the unload station taken along the line 14—14 of FIG. 13.

The unload station or terminal 26 can be provided for manual or automatic release of accumulated articles 36. In the exemplary embodiment, as shown in FIGS. 13 and 14, two opposing horizontally positioned air cylinders 470, 472 connected to a remotely controlled air valving means and a source of air (not shown) allow for selective activation of the cylinders 470, 472. The cylinders 470, 472 include reciprocating piston rods 476, 478 to each of which is attached a fixed bar member 480, 482, respectively, for selective insertion transversely to the path of movement 27 of the articles 36. The cylinders 470, 472 and their respective bars 480, 482 are horizontally spaced such that a withdrawal of the forwardmost bar 480 allows a release of a forwardmost article 484 while at the same moment the bar 482 is inserted between the just released article 484 and a next adjacent article 486 so as to impede a release of the article 486 and other accumulated articles 36.

The unload terminal 26 includes a face plate 488 having a lower portion 490 fastened to ends 492 of a pair of inner and outer support channels 494, 496 of the third straight section 24. The face plate 488 extends above the channels 494, 496 and has a like opening 498 in an upper portion 500 thereof having a T-shaped configuration similar to the opening 438 of the load terminal face plate 430.

Unlike the load terminal 12, a lower movable ride bar segment 502 extends through a bottom end 504 of a vertical leg portion 506 of the T-shaped opening 498 but remains unsecured so as to allow reciprocation. An inner end 508 of the movable ride bar segment 502 extends sufficiently inward into the third straight section 24 to engage with a cam assembly (not shown) through bar clamping assembly (not shown) similar to assembly 352 described and shown in FIGS. 7 and 9. An outer portion 510 of the movable ride bar segment 502 extends beyond the unload terminal face plate 488 and includes a downwardly inclined end portion 512.

In a like manner as the load terminal 12, the pair of upper fixed ride bars 240, 242 extend through a horizontal leg portion 514 of the T-shaped opening 498 and are held in position by bar clamps 516. An end portion 518 of each of the fixed ride bars 240, 242 is downwardly inclined to parallel end portion 512 of the lower bar segment 502. These downwardly inclined portions 512, 518 provide a gravity feed of the articles 36 upon release to a connecting conveyor or other receiving device.

To prevent a released article, as an example article 484, from deviating from the desired path of movement 27, a pair of spaced channels 520 extends outwardly from the unload terminal face plate 488 and supports therebetween a pair of spaced guide plates 522 positioned on each side of the lower movable ride bar segment 502 and below the end portion 518 of the upper fixed guide bars 240, 242 by spacers 524. The channels 520 also serve as a support for a pair of U-shaped brackets 526 which in turn support the air cylinders 470, 472.

In operation, individual articles 36 may be manually inserted in the opening 438 of the load terminal face plate 430 such that a bottom end, in this case the piston pin connecting end 34 of the connecting rod 28 is supported on the lower ride bar segment 444 and the article's upper end, in this case the two fastening brackets 35 of the crankshaft end 32 of the connecting rod 28, rests on the pair of upper fixed ride bars 240, 242. As additional articles 36 are inserted, adjacent articles 36 are pushed forward to engage the now reciprocating lower movable ride bar 338.

Because the lower movable ride bar 338 is positioned at a distance less than a distance between the lower piston pin connecting end 34 and a point of contact between the fastener brackets 35 of the connecting rods 28 and the upper ride bars 240, 242, each connecting rod 28 takes an inclined position between the upper ride bars 240, 242 and the lower ride bar 338 and by correct manual placement the upper end or crankshaft end 32 of the rod 28 is a greater distance away from the load terminal face plate 430 than its bottom end or piston pin end 34.

Figure 17:
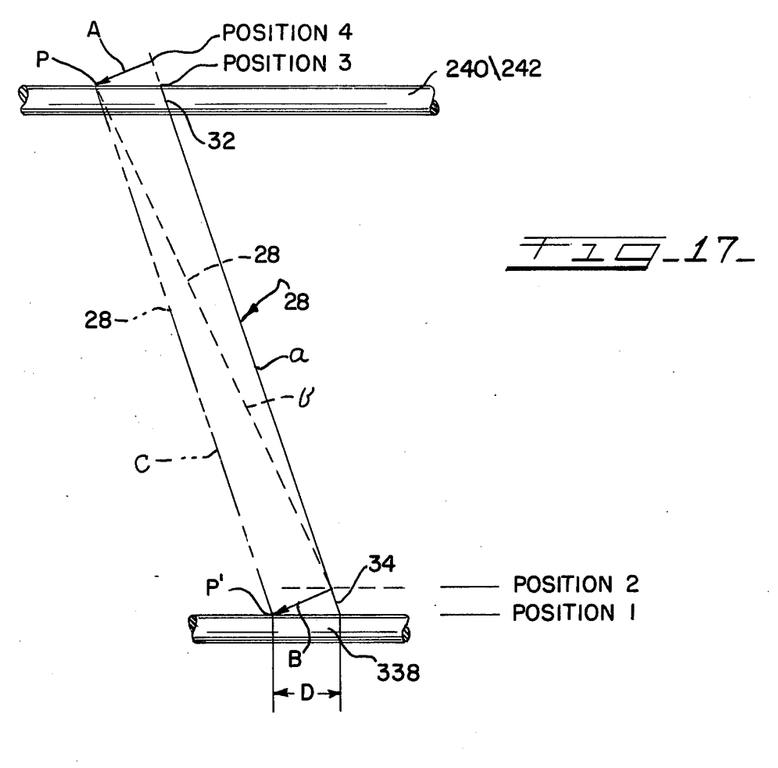
FIG. 17 is a schematic diagram illustrating movement of the articles along the conveyors.

Movement of the articles 36, or in this case connecting rods 28, can more easily be understood by viewing FIG. 17 in connection with the below description. The connecting rod 28 is first in an inclined position as depicted by solid line "a." As the lower movable ride bar 338 raises from a bottom position 1 to a top position 2, in this case $\frac{1}{2}$ inch, the upper end 32 of the connecting rod 28 is lifted upward and off of the upper stationary ride bars 240, 242, i.e. from position 3 to position 4. Because of its inclined orientation and therefore offset center of gravity, the upper end 32 of the rod 28 falls or rotates forward as denoted by arrow A until the fastening brackets 35 again engage the upper ride bars 240, 242 at a point P. The rod 28 is then in a position as denoted by broken line "b." Then as the lower movable ride bar 338 returns from the top position 2 to its bottom position 1, the bottom end 34 of the rod 28 disengages from the lower bar 338. This disengagement results because the fixed ride bars 238, 240 limit the downward movement of the rod 28 below the point P. The bottom end 34 is then free to swing or rotate forward as denoted by arrow B until the lower end 34 again engages the bottom movable bar 338 at a point P' so that the rod 28 is now in a position denoted by the line "c." In this manner, each cycle of the movable ride bar 338 produces a "walking" or rocking motion and the rod 28 moves a distance D in a forward direction, i.e. from the load station 12 to the unload station 26.

Once a first article, as an example the article 484, has reached unload terminal 26, further forward movement is halted by the bar 480 of the air cylinder 470. Another article, as an example the article 486, continues "walking" by its rise and fall movement. The article 486 will move forward until it engages the first rod 484 where its forward movement is halted because it may no longer rock. Note that each halted article, in this case articles 484, 486, continue to rise and fall since each is still in contact with the lower movable ride bar 338. Successive articles 36 engage to form a stacked condition where all forward movement is stopped but each article 36 continues to rise and fall. Further note that when the articles 36 are in a stacked condition, there is no relative movement therebetween. This is an important feature since a possibility of damage caused by such relative movement has been eliminated.

To effectuate the "walking" of the articles 36, it is important that the lower ride bar 338 be maintained within the same plane over its entire length so that there is one single uniform rise and fall movement of the entire lower ride bar 338. Also it is important that a plane of the upper stationary ride bars 240, 242 and the plane of the lower ride bar 338 remain substantially parallel during movement of the lower ride bar 338. This parallel alignment may be accomplished in part by aligning the top-dead-center mark of each cam assembly 300 with the point of contact 336 of the outer race 334 of each bearing 326 of the cam assembly 300 with the corresponding clamping guide assembly, as an example the guide 350. The joint 314 between a typical shaft, as an example shaft 146b, and the collar portions 306, 310 of the cam assembly 300 allows for such ready adjustment. Additionally, all of the connecting chains are maintained at proximately equal tension by the use of idle sprockets (not shown) located between connected sprockets which are powered from the single power source, the electric motor 58.

While various modifications may be suggested by those versed in the art, it should be understood that I wish to embody within the scope of the patent warranted hereon all such modifications as reasonably and properly come within the scope of my contribution to the art.

What is claimed is:

1. Apparatus for moving a plurality of articles from a first station to a second station and accumulating said articles on said apparatus adjacent said second station for selective delivery therefrom comprising:
   a series of support stands selectively spaced between said first and second stations;
   a series of connecting pairs of spaced inner and outer support channels carried by said support stands to in part define a path of movement between said first and second stations;
   a series of pairs of intermittently spaced uprights carried by said support channels and extending thereabove;
   a pair of spaced fixed ride bars carried in first clamping means attached to a top portion of said uprights respectively, said ride bars defining a supporting guide for a top portion of said articles between said first and second stations;
   a pair of vertically spaced guide means carried by a lower portion of said uprights, said means defining a path of movement for a bottom portion of said articles between said first and second stations; and
   reciprocating means including a source of rotary power connected by a series of power chains to a series of intermittently spaced shafts rotatively carried by said support channels and positioned transversely therebetween, said means further including:
      a series of eccentric cam assemblies carried one each by said series of shafts with said shaft disposed in an eccentrically positioned opening through each said cam assembly, said assembly including a bearing positioned on a bearing support portion of said assembly with said portion eccentrically aligned with said opening and at least one concentric cam assembly; and
      a lower ride bar in operative contact with a top-dead-center point of each of said bearings of said eccentric cam assemblies, said lower ride bar positioned on a center line of said path of movement of said articles, between said pair of guide means and a selective distance below said fixed ride bars;
   said eccentric cam assembly further comprising:
      a bushing plate defining a body about said opening and having:
         an outer fixed semicircular collar portion having a semicircular opening therein concentrically aligned with said eccentric opening;
         an annular flange joining said fixed collar portion, said flange having an outer diameter greater than a diameter of said fixed collar portion and concentrically aligned with a center line of said bushing plate; and
         said bearing support portion joining said annular flange on a side opposite said fixed collar portion and having an outer diameter less than that of said annular flange;
      a circular face plate with an eccentrically located circular opening therein marked to identify a top-dead-center thereof, said plate threadedly engaged to a face of said bearing support portion with said openings aligning and with said bearing being retained between said face plate and said annular flange; and
      a semi-circular removable collar portion having a semi-circular opening portion therein, said removable collar portion threadedly engage to said fixed collar portion to form a readily adjustable compressive joint about said shaft disposed in said eccentric opening formed by semi-circular opening portion of said collar portions,
   wherein said source of rotary power connected to said eccentric cam assemblies and to said concentric cam assembly by said shafts and said power chains rotates said eccentric cam assemblies to cause said lower ride bar to reciprocate in a vertical cycle and cause said articles carried by said fixed bars and said lower ride bar to walk from said first station to said second station and selectively accumulate.

2. Apparatus for moving a plurality of articles from a first station to a second station and accumulating said articles on said apparatus adjacent said second station for selective delivery therefrom comprising:
   a series of support stands selectively spaced between said first and second stations;
   a series of connecting pairs of spaced inner and outer support channels carried by said support stands to in part define a path of movement between said first and second stations;
   a series of pairs of intermittently spaced uprights carried by said support channels and extending thereabove;
   a pair of spaced fixed ride bars carried in first clamping means attached to a top portion of said uprights respectively, said ride bars defining a supporting guide for a top portion of said articles between said first and second stations;
   a pair of vertically spaced guide means carried by a lower portion of said uprights, said means defining a path of movement for a bottom portion of said articles between said first and second stations; and
   reciprocating means including a source of rotary power connected by a series of power chains to a series of intermittently spaced shafts rotatively carried by said support channels and positioned transversely therebetween, said means further including:
- a series of eccentric cam assemblies carried one each by said series of shafts with said shaft disposed in an eccentrically positioned opening through each said cam assembly, said assembly including a bearing positioned on a bearing support portion of said assembly with said portion eccentrically aligned with said opening; and
- a lower ride bar in operative contact with a top-dead-center point of each of said bearings of said eccentric cam assemblies, said lower ride bar positioned on a center line of said path of movement of said articles, between said pair of guide means and a selective distance below said fixed ride bars;

said apparatus further characterized by including,
- a concentric cam assembly carried by at least one said series of shafts and having a bearing disposed on said shaft and maintained in position on said shaft by a pair of collars located on said shaft and on each side of said bearing, and
- a first clamp guide assembly comprising,
  - two spaced block parts having a vertical slot formed in opposing inner vertical sides of each said block with each said slot having a radius top end merging with said side, an elongated semi-circular cutout formed along an inner top edge of each said block and a horizontal recess formed below said cutout,
  - an elongated bar joining bottoms of each said block portion to form a rigid assembly therebetween, and
  - a clamping bracket having an elongated radius cutout to join in a complementary manner with said block cutout and form a compressive joint when said bracket is positioned in said horizontal recess of said block parts respectively,
- said bearing of said concentric cam assembly being disposed between said blocks and in said slots and said lower ride bar being disposed in said block cutout and held therein by said clamping bracket with said cutout of said blocks and said brackets engaging a selective portion of an outer surface of said lower ride bar, said concentric cam assembly and said first clamp guide assembly preventing said lower ride bar from moving horizontally during reciprocation thereof,
- wherein said source of rotary power connected to said eccentric cam assemblies by said shafts and said power chains rotates said eccentric cam assemblies to cause said lower ride bar to reciprocate in a vertical cycle and cause said articles carried by said fixed bars and said lower ride bar to walk from said first station to said second station and selectively accumulate.

3. Apparatus for moving a plurality of articles from a first station to a second station and accumulating said articles on said apparatus adjacent said second station for selective delivery therefrom comprising:
- a series of support stands selectively spaced between said first and second stations;
- a series of connecting pairs of spaced inner and outer support channels carried by said support stands to in part define a path of movement between said first and second stations;
- a series of pairs of intermittently spaced uprights carried by said support channels and extending thereabove;
- a pair of spaced fixed ride bars carried in first clamping means attached to a top portion of said uprights respectively, said ride bars defining a supporting guide for a top portion of said articles between said first and second stations;
- a pair of vertically spaced guide means carried by a lower portion of said uprights, said means defining a path of movement for a bottom portion of said articles between said first and second stations; and
- reciprocating means including a source of rotary power connected by a series of power chains to a series of intermittently spaced shafts rotatively carried by said support channels and positioned transversely therebetween, said means further including:
  - a series of eccentric cam assemblies carried one each by said series of shafts with said shaft disposed in an eccentrically positioned opening through each said cam assembly, said assembly including a bearing positioned on a bearing support portion of said assembly with said portion eccentrically aligned with said opening and at least one concentric cam assembly; and
  - a lower ride bar in operative contact with a top-dead-center point of each of said bearings of said eccentric cam assemblies, said lower ride bar positioned on a center line of said path of movement of said articles, between said pair of guide means and a selective distance below said fixed ride bars;

said apparatus further characterized by including a second clamp guide comprising:
- an elongated block portion having a downward extending flange formed along a bottom outer edge and an elongated semi-circular cutout formed along a top inner edge; and
- a clamping bracket having a downward extending flange formed along a bottom outer edge and a radiused cutout formed along a top inner edge;

said block portion and said clamping bracket joining to form said clamp guide with said bottom flanges defining a recess to receive therein an outer race of said bearing of said eccentric cam assembly and with said top cutouts defining an opening to receive therein said lower ride bar and forming a compressive joint about a selective portion thereof,
wherein said source of rotary power connected to said eccentric cam assemblies by said shafts and said power chains rotates said cam assemblies to cause said lower ride bar to reciprocate in a vertical cycle and cause said articles carried by said fixed bars and said lower ride bar to walk from said first station to said second station and selectively accumulate.

4. Apparatus for moving a plurality of articles from a first station to a second station and accumulating said articles on said apparatus adjacent said second station for selective delivery therefrom comprising:
- a series of support stands selectively spaced between said first and second stations;
- a series of connecting pairs of spaced inner and outer support channels carried by said support stands to in part define a path of movement between said first and second stations;

a series of pairs of intermittently spaced uprights carried by said support channels and extending thereabove;

a pair of spaced fixed ride bars carried in first clamping means attached to a top portion of said uprights respectively, said first clamping means allowing said ride bar to be rotated to expose selective portions of an outer surface of said ride bar and ready replacement of said ride bar upon wear of said ride bar being excessive, said ride bars defining a supporting guide for a top portion of said articles between said first and second stations;

a pair of vertically spaced guide means carried by a lower portion of said uprights, said means defining a path of movement for a bottom portion of said articles between said first and second stations; and reciprocating means including a source of rotary power connected by a series of power chains to a series of intermittently spaced shafts rotatively carried by said support channels and positioned transversely therebetween, said means further including:

a series of eccentric cam assemblies carried one each by said series of shafts with said shaft disposed in an eccentrically positioned opening through each said cam assembly, said assembly including a bearing positioned on a bearing support portion of said assembly with said portion eccentrically aligned with said opening, and at least one concentric cam assembly comprising a bearing disposed on one of said shafts; and a lower ride bar in operative contact with a top-dead-center point of each of said bearings of said eccentric cam assemblies through second clamping means, and in operative contact with said bearing of said concentric cam assembly through a third clamping means, said second and third clamping means allowing said lower ride bar to be rotated to expose selective portions of an outer surface of said ride bar and ready replacement of said lower ride bar upon wear of said ride bar being excessive, said lower ride bar positioned on a center line of said path of movement of said articles, between said pair of guide means and a selective distance below said fixed ride bars;

wherein said source of rotary power connected to said eccentric cam assemblies and to said concentric cam assembly by said shafts and said power chains rotates said eccentric cam assemblies to cause said lower ride bar to reciprocate in a uniform and linear vertical cycle to cause said articles carried by said fixed bars and said lower ride bar to walk from said first station to said second station and selectively accumulate in a damage-free manner.

5. An apparatus as defined by claim 4 and further characterized by including a load terminal to allow said articles to be loaded into said apparatus, said terminal comprising:

a load terminal face plate positioned transversely across and attached to ends of said support channels positioned adjacent to said first station, said plate extending above said channels and having an elongated vertical opening therein to receive said articles;

a pair of clamping means carried by said face plate on each side of said opening respectively in an upper portion thereof to receive therein ends of said fixed ride bars, said clamping means having a partial gripping surface to form a compressive joint about a selective portion of an outer surface of said fixed ride bars;

a stationary ride bar segment having a downward radiused outer end extending beyond said face plate and an inner end extending inwardly and terminating adjacent to an end of said lower ride bar, said segment positioned through a bottom end of said opening and affixed to said plate by a clamping device having a partial gripping surface to form a compressive joint about a selective portion of an outer surface of said segment.

6. An apparatus as defined by claim 4 and further characterized by including an unload terminal to allow selective release of said articles from said apparatus, said terminal comprising:

an unload terminal face plate positioned transversely across and attached to ends of said support channels positioned adjacent to said second station, said plate extending above said channels and having an elongated vertical opening therein to allow passage of said articles;

said upper ride bars each having outer portions extending through an upper portion of said opening with each said outer portion having a downwardly sloping end portion;

said lower ride bar having an outer portion extending through a bottom end of said opening and having a downwardly sloping end portion positioned parallel to said end portions of said upper ride bars and an inner end portion operatively connected to a cam assembly of said series of cam assemblies to provide reciprocation thereof;

guide means attached to spaced supports extending outwardly from said face plate and attached thereto, said means forming a guide for said articles engaging said downwardly sloped ride bar end portions; and release means carried by said spaced supports to selectively allow release of said articles accumulated at said second point, said means including a first retractable stop positioned transversely across said path of movement of said articles to engage a forwardmost article and prevent a release thereof and a second retractable stop positioned transversely across said path of said articles to engage a next adjacent article to said forwardmost article upon said first stop being retracted to allow release of said forwardmost article.

7. Apparatus as defined by claim 4 and further characterized by:

a first corner section means to provide a directional change in said path of movement of said articles moving from said first station to said second station, said corner section having ride bars formed on a radius to define a like movement path; and a straight section having an end connecting to a first end of said corner section;

wherein said articles may move from said first station to said second station about interpositioned obstacles.

8. Apparatus as defined by claim 7 and further characterized by said corner section means being a drive corner with said directional change proximating 90 degrees radius segment, said drive corner comprising:

an L-shaped base plate with said source of rotary power being a motor carried by said plate adjacent to an axis of said radius segment;

speed reduction means carried by said base plate and operatively connected to said motor to reduce a rotative velocity of an output therefrom;

load dividing means carried by said base plate and operatively connected to said speed reduction means, said dividing means having a first output shaft and second output shaft positioned to form a proximate right angle therebetween with each said shaft positioned below and obliquely to said ride bars and having respective outer ends rotatably supported in bearing means attached to an outer support channel of a first and second pair of spaced drive corner support channels supported by and positioned parallel to legs of said L-shaped base plate;

a first and second drive corner shaft transversely positioned to and rotatably carried in bearing means attached to outer ends of said first and second pair of channels respectively;

drive corner cam assemblies of said series of cam assemblies, said assemblies carried one each by said first and second drive corner shafts and said first output shaft and positioned below said lower ride bar and in operative contact with such; and a first drive chain and second drive chain carried by first chain sprockets and second chain sprockets attached to said first and second output shafts and said first and second drive corner shafts respectively.

9. Apparatus as defined by claim 7 and further characterized by including, a second corner section means to provide a further directional change in said path of movement of said article from said first point to said second point, said second corner section means having ride bars formed on a radius to define a like movement path for said articles, and a first and a second end with said first end connected to an opposite end of said straight section.

10. Apparatus as defined by claim 9 and further characterized by said second corner being a driven corner with said directional change proximating 90 degree radius segment and comprising:

an L-shaped driven-corner-base plate;

a first and second pair of driven corner inner and outer spaced support channels carried by said base plate, said pairs of channels being respectively positioned parallel to legs of said base plate with inner ends of said inner channels joining to form a proximately 90 degree mitered joint;

a first driven corner shaft and a second driven corner shaft each rotatably carried in bearing means attached to outer ends of said pairs of support channels respectively, said first driven corner shaft operatively connected to said source of rotary power through said straight section;

a bevel gear drive positioned adjacent an axis of said radius segment of said corner, said drive having an input shaft positioned at proximately 90 degrees with respect to an output shaft, said input shaft extending below and positioned obliquely to said lower ride bar and having an outer end journaled in a bearing means carried by said first outer support channel of said first pair of channels and operatively connected to said first driven corner shaft by a first power chain carried on first chain sprockets attached to said first driven corner shaft and said input shaft respectively, and said output shaft of said bevel gear drive extending below and positioned obliquely to said lower ride bar and having an outer end journaled in a bearing means carried by said outer support channel of said second pair of channels and operatively connected to said second driven corner shaft by a second power chain carried on second chain sprockets attached to said second driven corner shaft and said output shaft respectively; and driven corner cam assemblies of said series of cam assemblies, one each of said cam assemblies attached to said first and second driven corner shafts and said bevel gear output shaft with said assemblies in operative contact with said lower ride bar.

* * * * *